(12) United States Patent
Booker, Sr.

(10) Patent No.: US 9,389,010 B1
(45) Date of Patent: Jul. 12, 2016

(54) SUPER ICE CHEST

(71) Applicant: Demetre Booker, Sr., Palmdale, CA (US)

(72) Inventor: Demetre Booker, Sr., Palmdale, CA (US)

( * ) Notice: Subject to any disclaimer, the term of this patent is extended or adjusted under 35 U.S.C. 154(b) by 0 days.

(21) Appl. No.: 14/788,729

(22) Filed: Jun. 30, 2015

Related U.S. Application Data

(60) Provisional application No. 62/027,644, filed on Jul. 22, 2014.

(51) Int. Cl.
*F25D 3/08* (2006.01)
*B62B 3/02* (2006.01)
*A01K 97/10* (2006.01)

(52) U.S. Cl.
CPC . *F25D 3/08* (2013.01); *A01K 97/10* (2013.01); *B62B 3/02* (2013.01)

(58) Field of Classification Search
CPC ............. F25D 5/06; F25D 5/08; A01K 97/08; A01K 97/10; B62B 3/02
USPC .................... 280/47.34, 47.35, 47.371, 655.1
See application file for complete search history.

(56) References Cited

U.S. PATENT DOCUMENTS

| | | | |
|---|---|---|---|
| 5,480,170 A | 1/1996 | Kaiser, II | |
| 6,446,988 B1* | 9/2002 | Kho | A45C 5/14 16/405 |
| 6,467,779 B1* | 10/2002 | Mills | A01K 97/06 224/922 |
| 6,993,931 B1 | 2/2006 | Hamilton | |
| 7,155,859 B1* | 1/2007 | Brooks | A01K 97/06 206/315.11 |
| 8,256,156 B1* | 9/2012 | Burgoyne, Jr. | A01K 97/06 206/315.11 |
| 9,150,235 B2* | 10/2015 | Galante | B62B 1/12 |
| 2009/0217699 A1* | 9/2009 | Ball | A45C 11/20 62/457.7 |
| 2010/0155349 A1 | 6/2010 | Murphy | |
| 2011/0239525 A1* | 10/2011 | Morales | A01K 97/06 43/54.1 |

* cited by examiner

*Primary Examiner* — John Walters
(74) *Attorney, Agent, or Firm* — RG Patent Consulting, LLC; Rachel Gilboy

(57) ABSTRACT

A specially designed cooler featuring an integrated strap system for conveying non-food-and-drink accessories, primarily chairs, as well as other outdoor accessories to provide a unique yet practical new alternative to standard beverage coolers that allows users to transport everything they need in one trip.

18 Claims, 6 Drawing Sheets

SUPER ICE CHEST

CROSS-REFERENCE TO RELATED APPLICATION

The present application is related to and claims priority from provisional application Ser. No. 62/027,644 filed Jul. 22, 2014 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of devices for use as transporters of coolers, chairs and other nonperishable items and more specifically relates to a specially designed cooler featuring integrated security straps for conveying non-food-and-drink accessories, primarily chairs, as well as other outdoor accessories to provide a unique yet practical new alternative to standard beverage coolers that allows users to transport everything they need in one trip.

2. Description of the Related Art

The warmth of the spring and summer seasons makes for the perfect time of year to indulge in all manners of outdoor activities. From playing spirited sports games on city streets or splashing gleefully in a backyard pool to embarking on a camping adventure or languidly casting a fishing pole from a boat, adults and children alike seek a myriad of ways to bask in these seasons' pleasantly balmy days and evenings. One of the most revered warm-weather pastimes is visiting the closest beach. Whether people are seeking to master the rough tides on surfboards, swim in the warm salty waters, or to simply lie supine under the blazing summer sun, these tropical paradises attract millions of surf and sand aficionados every year. Another favored activity that brings people out of their homes in the spring and summer is attending sporting events. Afternoons spent at youth soccer matches, weekend forays to show support for a community baseball league, and entire Saturdays devoted to college football games and the requisite tailgate parties beforehand are all common, and extremely enjoyable, occurrences during this time of year.

When heading to the beach for the day or planning to spend an extended amount of time at a sporting event, consumers prepare for these jaunts by bringing along items that will provide comfort while they are there. Lounge chairs and seat cushions are must-haves for these types of outdoor activities, as are coolers bursting with food and drink to provide refreshment during these long days. Add in umbrellas, towels, blankets, and game equipment, just to name a few items, and outdoor enthusiasts have everything needed to settle in for a full day of fun. Yet, as can be imagined, managing all of this equipment can be quite challenging. Particularly, it is often necessary to make repeated trips to and from a vehicle to unpack and carry coolers, chairs, and other accessories to and from the settling spot. After such laborious back and forth, many may find themselves too physically exhausted to begin enjoying their activities right away.

Various attempts have been made to solve problems found in devices for use as transporters of coolers, chairs and other nonperishable items art. Among these are found in: U.S. Publication No. 2010/0155349 to Michael B. Murphy; U.S. Pat. No. 5,480,170 to Ronald R. Kaiser, II; and U.S. Pat. No. 6,993,931 to Cindy T. Hamilton. This prior art is representative of devices for use as transporters of coolers, chairs and other nonperishable items.

None of the above inventions and patents, taken either singly or in combination, is seen to describe the invention as claimed. Thus, a need exists for a reliable Super Ice Chest, a specially designed cooler featuring integrated security straps for conveying non-food-and-drink accessories, primarily chairs, as well as other outdoor accessories to provide a unique yet practical new alternative to standard beverage coolers that allows users to transport everything they need in one trip and to avoid the above-mentioned problems.

BRIEF SUMMARY OF THE INVENTION

In view of the foregoing disadvantages inherent in the known devices for use as transporters of coolers, chairs and other nonperishable items art, the present invention provides a novel Super Ice Chest. The general purpose of the present invention, which will be described subsequently in greater detail, is to provide a specially designed cooler featuring integrated security straps for conveying non-food-and-drink accessories, primarily chairs, as well as other outdoor accessories to provide a unique yet practical new alternative to standard beverage coolers that allows users to transport everything they need in one trip. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, lock-out tag-out bar system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a device for use as transporters of coolers, chairs and other nonperishable items and more particularly to a Super Ice Chest, a specially designed cooler featuring integrated security straps for conveying non-food-and-drink accessories, primarily chairs, as well as other outdoor accessories to provide a unique yet practical new alternative to standard beverage coolers that allows users to transport everything they need in one trip.

Figure 1:
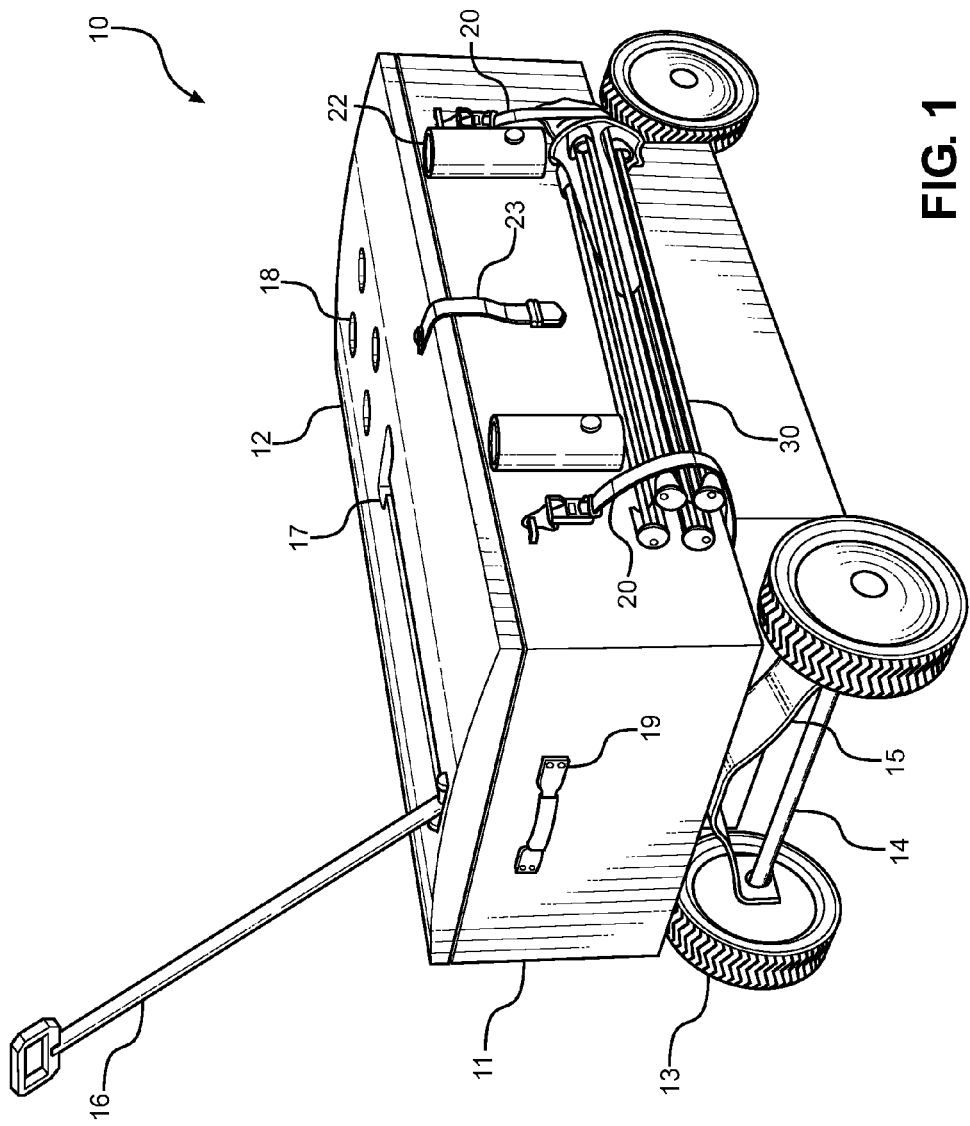
FIG. 1 shows a front perspective view illustrating the Super Ice Chest according to the main embodiment of the present invention.
Figure 2:
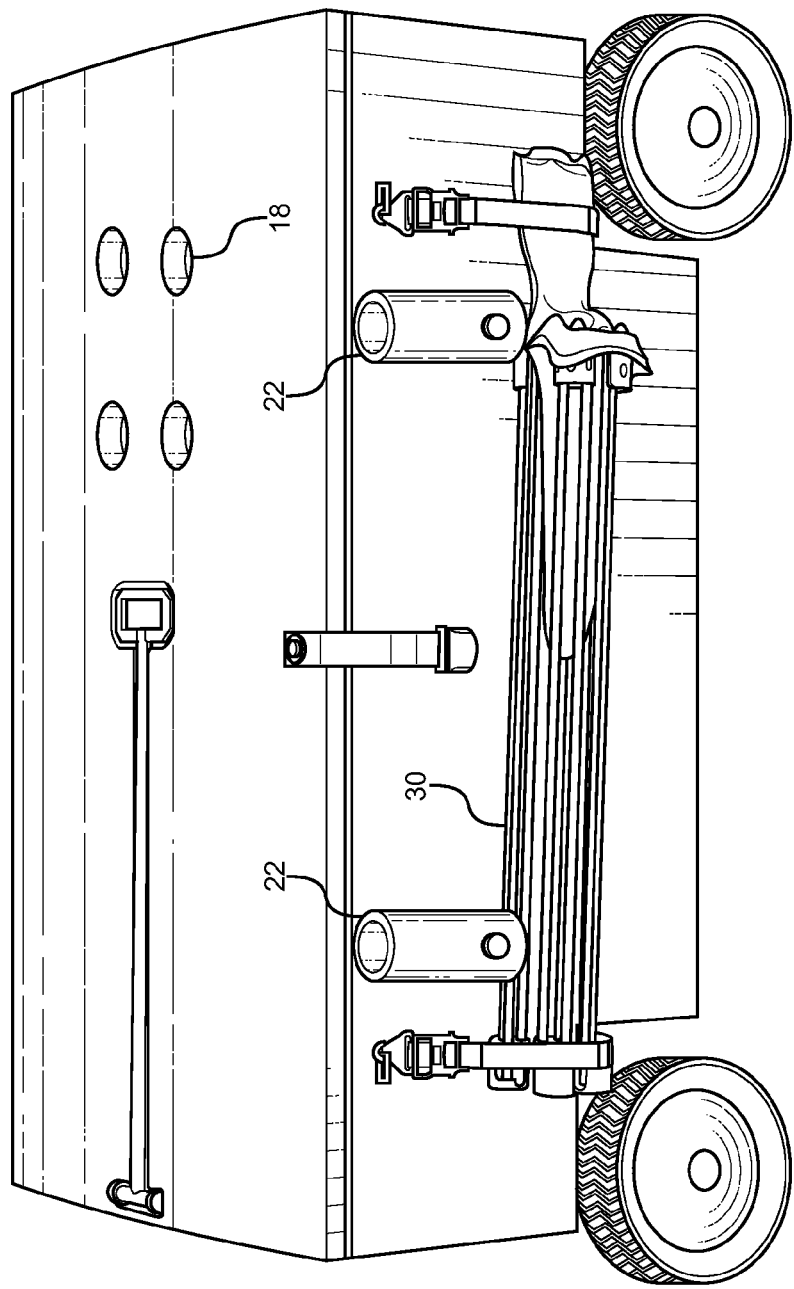
FIG. 2 shows a side perspective view illustrating the Super Ice Chest according to the main embodiment of the present invention.
Figure 3:
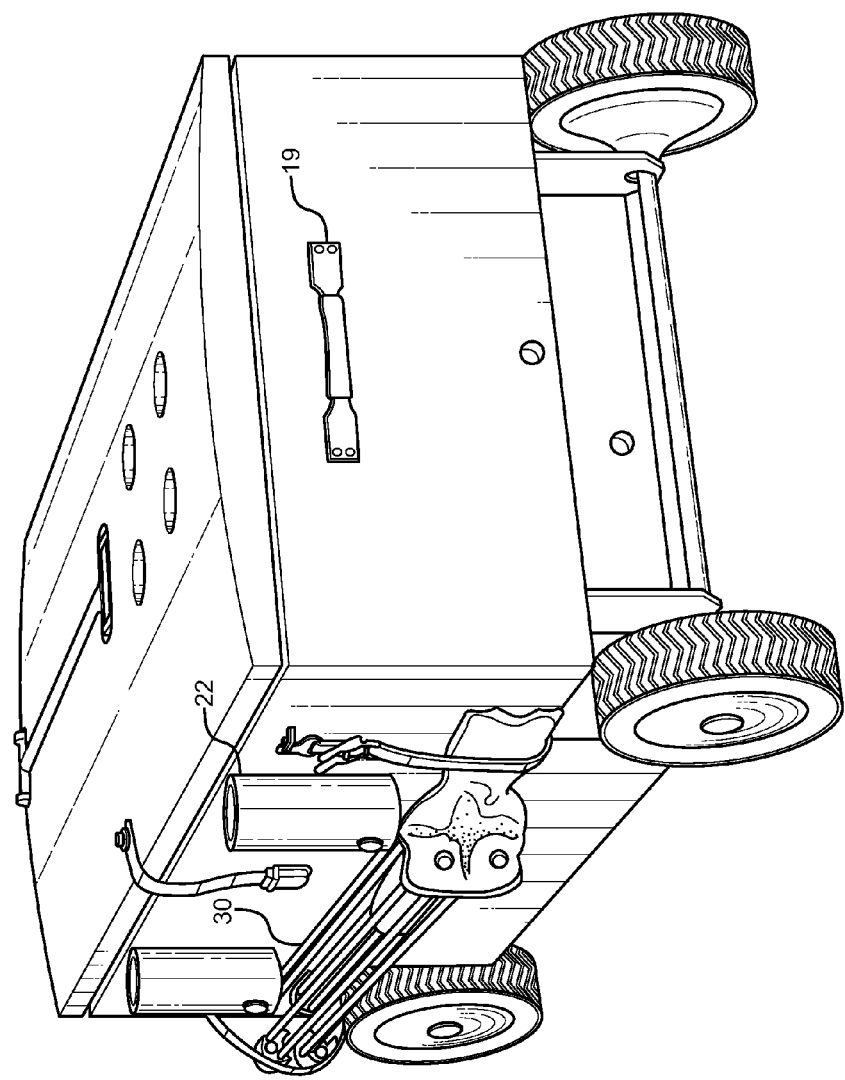
FIG. 3 shows a back perspective view illustrating the Super Ice Chest according to the main embodiment of the present invention.
Figure 4:
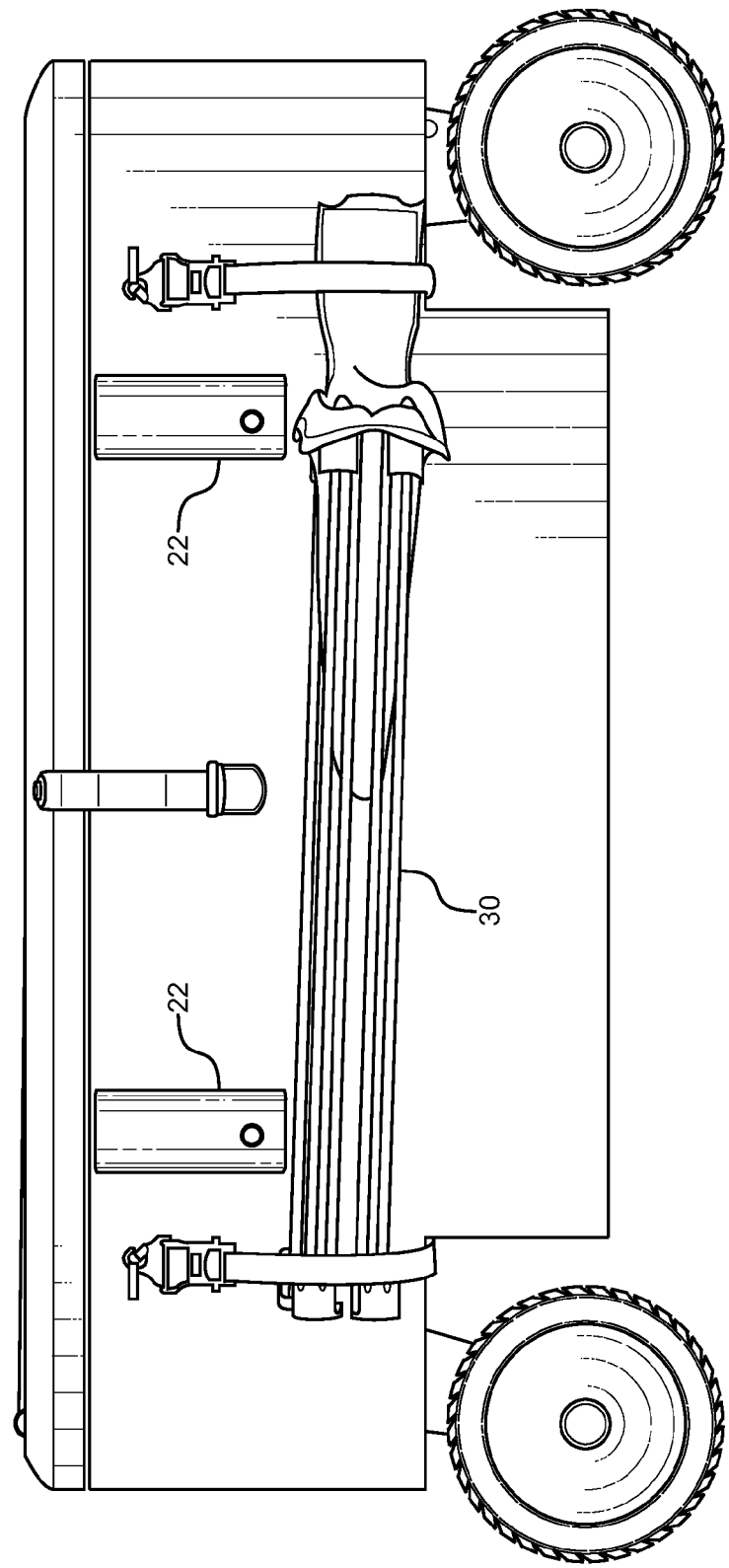
FIG. 4 shows a side view illustrating the Super Ice Chest according to the main embodiment of the present invention.

Referring now to the drawings, FIG. 1 illustrates the main embodiment of the instant invention as a Super Ice Chest (10) offering consumers a practical solution to the aforementioned challenges. As the name implies, the Super Ice Chest is a specially designed multifunctional cooler that features storage and conveyance capabilities for a host of nonperishable accessories, in addition to food and drink.

Essentially similar in appearance to standard portable ice chests, the Super Ice Chest (10) is usually formed having a generally rectangular shaped body (11) having and interior volume, and can be fabricated from a durable, heavy duty plastic material. In the rectangular configuration illustrated, the Super Ice Chest (10) includes front and back walls, two opposite side walls, a bottom section including an interior bottom floor portion, and a lid member (12). The lid member (12) is pivotally connected, via at least one hinge member, on one edge to a top portion of one of the side walls of the body (11) and is adapted to removably cover the interior volume. The body walls and bottom section, and the lid, are formed having hollow spaces therein for receiving insulation, such as two-inch (2") thick insulation known in the art, to facilitate maximum cold retention. In the rectangular configuration illustrated, the body can measure approximately two feet (2') in length and three feet (3') in width. To facilitate easier transportation of the Super Ice Chest, wheels (13) are attached to the underside of the bottom section of the body. The wheels can be formed as two sets of wheels, wherein each set are formed as two wheels connected together via an axle member (14) between them and incorporating a bracket member (15) that attaches between each respective set and the bottom section of the body, such that one set can be attached to a portion of the bottom section adjacent the front wall and one set can be attached to a portion of the bottom section adjacent the back wall, thereby stabilizing the Super Ice Chest while transporting. A comfortable folding tow handle (16) is pivotally attached to a front portion of the lid to provide easy transport. For convenience and to avoid an un-level surface, the lid can be formed with an indentation (17) on its top surface shaped to receive the tow handle in a recessed fashion. The lid can also include recessed cup holders (18). In order to facilitate lifting of the Super Ice Chest, front and back handles (19) could also be included. The interior volume of the Super Ice Chest can be as large as 20-gallons or more.

Unique to this product and what sets it apart from standard coolers is found in its additional storage and conveyance capabilities. This is achieved in part by a practical strap system. The strap system includes a series of lockable, adjustable belt straps (20) fashioned from similar durable material as seat belts. The two straps (20) would be evenly spaced apart on each opposite side of the body. These would serve to securely affix a collection of foldable chairs (30) as well as other types of equipment, including but not limited to fishing rods, umbrellas, clothing, and sports equipment, directly on the side of the cooler. Each strap is securely connected to the main body in such a way as to form an adjustable looped holding portion adapted to allow the folding chairs to slide therein and then be securely held against the sides of the main body.

Figure 5:
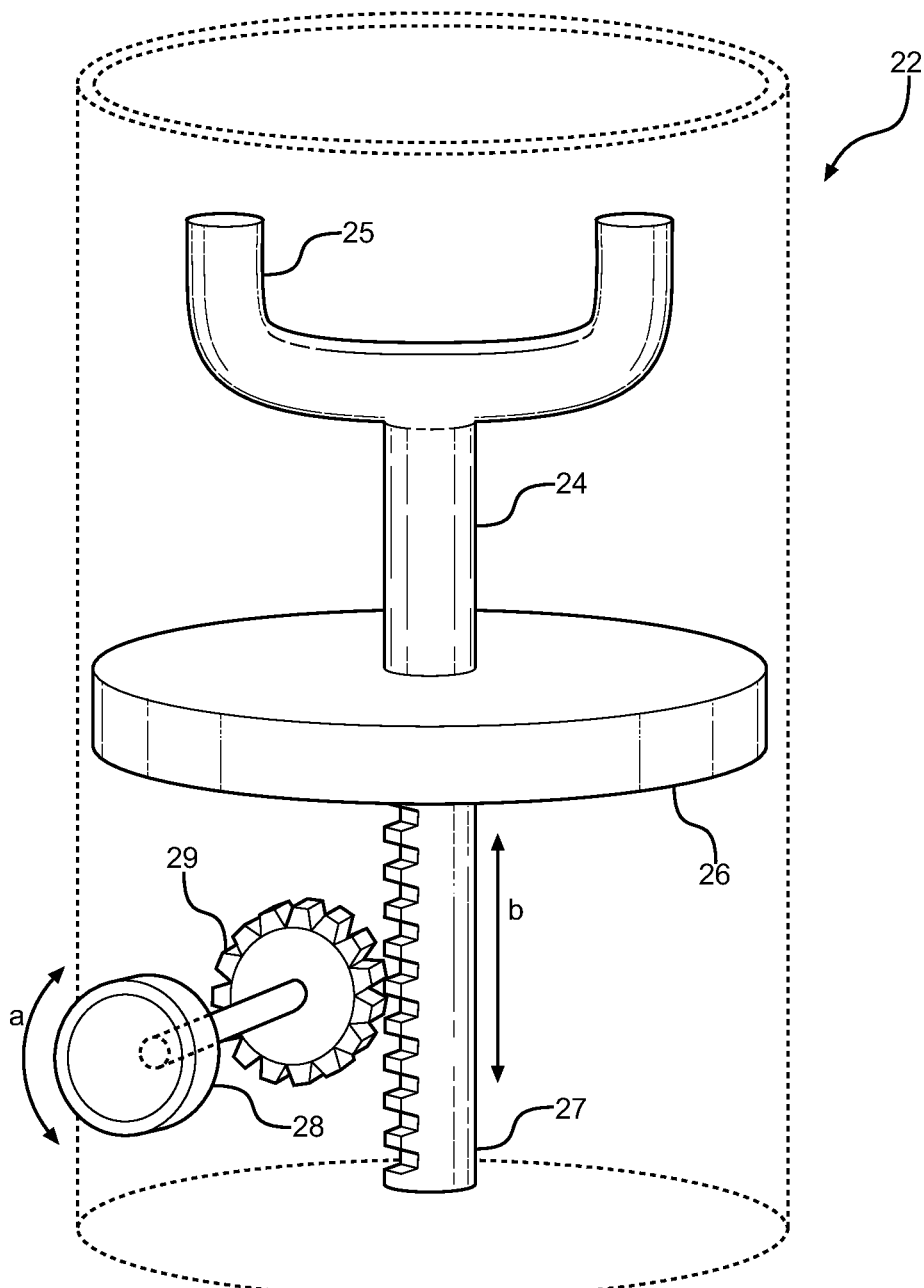
FIG. 5 shows a perspective view illustrating a fishing rod holder and the holder mechanism therein.
Figure 6:
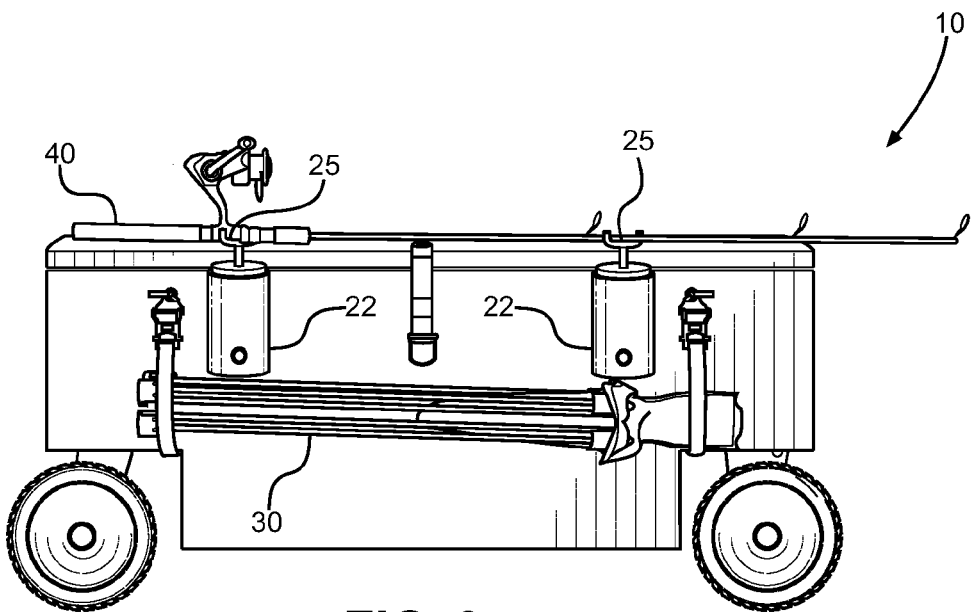
FIG. 6 shows a side view illustrating the Super Ice Chest with the fishing rod holders holding a fishing pole therebetween in a horizontal position.
Figure 7:
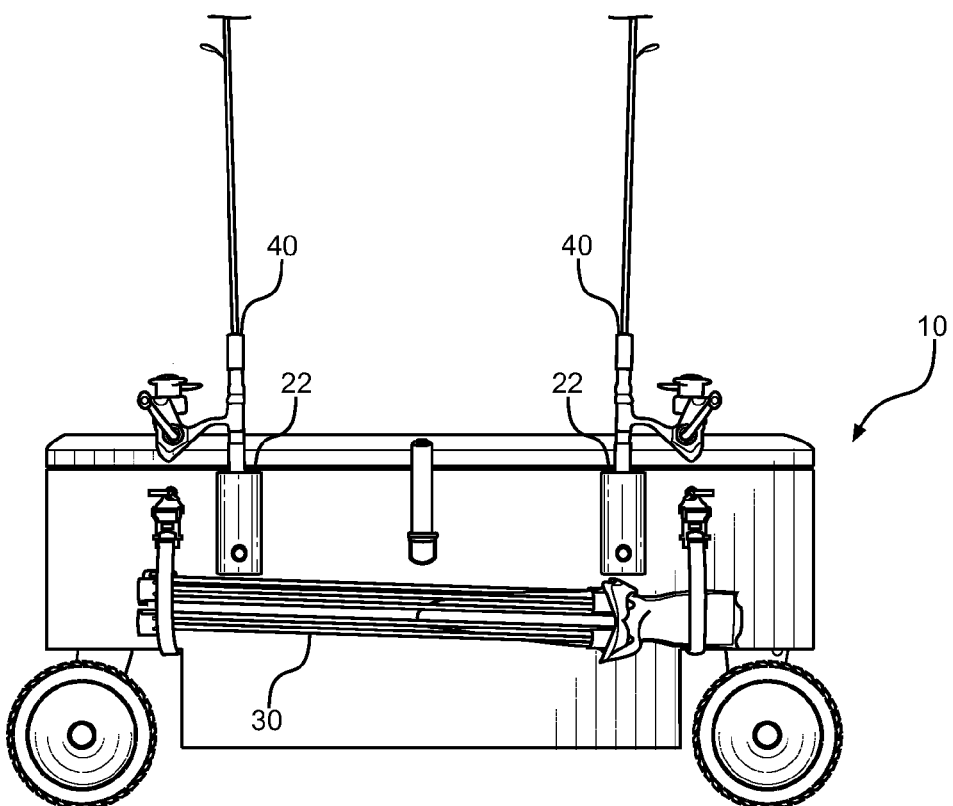
FIG. 7 shows a side view illustrating the Super Ice Chest with the fishing rod holders holding fishing poles individually in a vertical position.

In addition, two fishing rod holders (22), illustrated in FIGS. 5 through 7, are mounted on at least one side of the main body and are formed as elongated hollow cylinders having a movable holder mechanism (24) therein. The holder mechanism includes a U-shaped holding portion (25) on a top portion thereof, a central disc portion (26) adapted to slide smoothly up and down (arrow b) within each hollow cylinder and stabilize the holder mechanism within the hollow cylinder, and a toothed rack (27) for an adjustable rack and pinion configuration on a bottom portion thereof. Further, a rotating (arrow a) adjustment knob (28) is mounted to and through a side wall of each of the fishing rod holders and includes a toothed wheel (29) that acts as a pinion in the rack and pinion configuration, such that the adjustment knob and rack and pinion configuration is adapted to move the holding portions (25) of each fishing rod holder (22) upwards when it is desired to hold fishing rods above and between the two fishing rod holders (22). Further, when the holder mechanism is in the lowered position the hollow cylinders have enough space therein to hold the handle end of a fishing rod therein and the fishing rod (40) in a vertical configuration.

A strap/lock assembly (23) is also included and removably attached on a side of the lid opposite from the side that is pivotally connected to the body side wall, and removably attachable to the respective side of the body, to removably secure the lid while the unit is in transport. Thus conceived, the Super Ice Chest's interior could be packed full of ice, sandwiches, beer, and sodas; then, all other accessories could be easily strapped to the sides of the chest. With every required item in one place, a user need only wheel the entire unit to the destination of choice. As an additional consideration, the Super Ice Chest could be offered in a variety of colors and styles to appeal to individual tastes. As an additional consideration, kits containing straps, snaps, and hinges could also be sold to accommodate existing ice chests.

The Super Ice Chest would provide outdoor enthusiasts with a simple yet effective means of storing and carrying everything needed for any chosen activity. A fully functional cooler, the Super Ice Chest would be able to keep perishable food and beverage items fresh for hours while essentially doubling as a carryall for a plethora of other goods. Designed with an easily mastered, universal strap system, the Super Ice Chest would securely accommodate several foldable chairs along with any other outdoor accessory, all of which could be strapped to the cooler in a matter of minutes. In this manner, the Super Ice Chest would eliminate the need to make repeated trips to and from an automobile when all one wishes to do is enjoy non-cumbersome, hassle-free vacation and fun time. Universal in design yet creative in concept, the Super Ice Chest would certainly appeal to a broad range of consumers, from beach goers and campers to household consumers and tailgaters, hunters, and fishermen. A multifaceted storage and conveyance system, this practical product would ensure a fun and leisurely time for all. The Super Ice Chest is cost-effective to produce in the embodiments, as shown in FIG. 1.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An improved ice chest comprising:
    a main body including front and back walls, two opposite side walls, and a bottom section including an interior bottom floor portion forming an interior volume;
    a lid member pivotally connected via at least one hinge member on one edge thereof to a top portion of one of said side walls of said main body and is adapted to removably cover said interior volume;
    a plurality of wheels attached to an underside of said bottom section of said main body;
    a tow handle pivotally attached to a front portion of said lid; and
    a strap system including:
        at least two strap members on each said opposite side wall of said main body adapted to securely hold equipment members thereto, wherein each strap is securely connected to said main body so as to form an adjustable looped holding portion, and adapted such that said equipment can be placed between and through each said strap member looped holding portion and then securely tightened against each respective side wall of said main body, and wherein said equipment will not interfere with the functionality of said lid member or any of said plurality of wheels.

2. The improved ice chest of claim 1, further comprising at least two fishing rod holders mounted on at least one said side wall of said main body and are formed as elongated hollow cylinders having a movable holder mechanism therein, said holder mechanism includes a holding portion on a top portion thereof, a central disc portion, and a toothed rack forming part of an adjustable rack and pinion configuration on a bottom portion thereof; a rotating adjustment knob mounted to and through a side wall of each of said at least two fishing rod holders and includes a toothed wheel that acts as a pinion in said rack and pinion configuration, such that said adjustment knob and rack and pinion configuration are adapted to move said holding portions of each said at least two fishing rod holders upwards when it is desired to hold fishing rods above and between said at least two fishing rod holders, and when said holder mechanism is in a lowered position said hollow cylinders have enough space therein to hold a handle end of a fishing rod therein and said fishing rod in a vertical configuration.

3. The improved ice chest of claim 1, wherein each said holding portion of each said movable holder mechanism is formed having a U-shape adapted to hold said fishing poles placed therein.

4. The improved ice chest of claim 1, wherein said main body and said lid are formed from a plastic material.

5. The improved ice chest of claim 1, wherein said main body walls, said bottom section, and said lid, are formed having hollow spaces therein for receiving insulation adapted to facilitate cold air retention within said main body interior volume.

6. The improved ice chest of claim 5, wherein said insulation is two inches thick.

7. The improved ice chest of claim 1, wherein said main body is formed having dimensions including said front and back walls being two feet in length, and said two opposite side walls being three feet in length.

8. The improved ice chest of claim 1, wherein said plurality of wheels are formed as two sets of wheels, wherein each set comprises two wheels connected together via an axle member therebetween and incorporates a bracket member that attaches between each respective set and said bottom section of said body, such that one set can be attached to a portion of said bottom section adjacent said front wall and one set can be attached to a portion of said bottom section adjacent said back wall, thereby stabilizing said improved ice chest while transporting.

9. The improved ice chest of claim 1, wherein said lid is formed with an indentation on a top surface thereof shaped to receive said tow handle in a recessed fashion, to thereby adapted said lid to provide a flat top surface of when said tow handle is pivoted on top thereof.

10. The improved ice chest of claim 1, wherein said lid further includes at least one recessed cup holder.

11. The improved ice chest of claim 1, wherein said main body further comprises at least one handle on said front and back walls adapted to aid a person in the carrying of said improved ice chest.

12. The improved ice chest of claim 1, wherein said interior volume can hold at least twenty gallons of liquid therein.

13. The improved ice chest of claim 1, further comprising a strap lock assembly removably attached on a side edge of said lid opposite from said side edge that is pivotally connected to said main body side wall, and is removably attachable to the adjacent side wall of said main body, to thereby removably secure said lid in a closed position while said improved ice chest is in transport.

14. A kit adapted to be used with an ice chest wherein said ice chest comprises a main body including front and back walls, two opposite side walls, and a bottom section including an interior bottom floor portion forming an interior volume; a lid member pivotally connected via at least one hinge member on one edge thereof to a top portion of one of said side walls of said main body and is adapted to removably cover said interior volume; a plurality of wheels attached to an underside of said bottom section of said main body; a tow handle pivotally attached to a front portion of said lid, wherein said kit comprises:
    a strap system including:
        at least two strap members on each said opposite side wall of said main body adapted to securely hold equipment members thereto, wherein each strap is securely connected to said main body so as to form an adjustable looped holding portion, and adapted such that said equipment can be placed between and through each said strap member looped holding portion and then securely tightened against each respective side wall of said main body, and wherein said equipment will not interfere with the functionality of said lid member or any of said plurality of wheels.

15. A combination of an improved ice chest and at least one folding chair comprising:
   a. an improved ice chest comprising:
      a main body including front and back walls, two opposite side walls, and a bottom section including an interior bottom floor portion forming an interior volume;
      a lid member pivotally connected via at least one hinge member on one edge thereof to a top portion of one of said side walls of said main body and is adapted to removably cover said interior volume;
      a plurality of wheels attached to an underside of said bottom section of said main body;
      a tow handle pivotally attached to a front portion of said lid; and
      a strap system including:
         at least two strap members on each said opposite side wall of said main body adapted to securely hold equipment members thereto, wherein each strap is securely connected to said main body so as to form an adjustable looped holding portion, and adapted such that said equipment can be placed between and through each said strap member looped holding portion and then securely tightened against each respective side wall of said main body,
      and wherein said equipment will not interfere with the functionality of said lid member or any of said plurality of wheels; and
   b. a folding chair comprising:
      a fabric seat portion;
      a fabric back rest portion; and
      at least three collapsible legs,
      such that said folding chair is adapted to fold into a shape that can fit within said adjustable looped holding portions of said strap members, and thereby be held firmly against said side wall of said main body for transporting along with said ice chest.

16. The combination of claim 15, wherein there are two folding chairs, one of said two folding chairs is adapted to be removably placed within and between said two strap members on one said side wall of said main body, and the second of said two folding chairs is adapted to be removably placed within and between said two strap members on the opposite said side wall of said main body, such that both chairs can be held firmly against respective said side wall of said main body for transporting along with said ice chest.

17. The improved ice chest of claim 15, further comprising at least two fishing rod holders mounted on at least one said side wall of said main body and are formed as elongated hollow cylinders having a movable holder mechanism therein, said holder mechanism includes a holding portion on a top portion thereof, a central disc portion, and a toothed rack forming part of an adjustable rack and pinion configuration on a bottom portion thereof; a rotating adjustment knob mounted to and through a side wall of each of said at least two fishing rod holders and includes a toothed wheel that acts as a pinion in said rack and pinion configuration, such that said adjustment knob and rack and pinion configuration are adapted to move said holding portions of each said at least two fishing rod holders upwards when it is desired to hold fishing rods above and between said at least two fishing rod holders, and when said holder mechanism is in a lowered position said hollow cylinders have enough space therein to hold a handle end of a fishing rod therein and said fishing rod in a vertical configuration.

18. The improved ice chest of claim 17, wherein each said holding portion of each said movable holder mechanism is formed having a U-shape adapted to hold said fishing poles placed therein.

* * * * *